United States Patent [19]

Uesugi

[11] Patent Number: 4,621,316
[45] Date of Patent: Nov. 4, 1986

[54] INVERTER CONTROL CIRCUIT

[75] Inventor: Michika Uesugi, Fuji, Japan

[73] Assignee: Kabushiki Kaisha Toshiba, Kawasaki, Japan

[21] Appl. No.: 662,562

[22] Filed: Oct. 19, 1984

[30] Foreign Application Priority Data

Oct. 20, 1983 [JP] Japan .................... 58-196304

[51] Int. Cl.[4] ............................. H02M 7/538
[52] U.S. Cl. ....................... 363/132; 363/41; 363/98
[58] Field of Search ............ 363/41, 95, 97, 48, 363/132

[56] References Cited

U.S. PATENT DOCUMENTS

| 4,290,108 | 9/1981 | Woehrle et al. | 363/41 |
| 4,466,052 | 8/1984 | Thrap | 363/41 |
| 4,502,105 | 2/1985 | Jessee | 363/41 |
| 4,504,899 | 3/1985 | Jessee | 363/41 |

FOREIGN PATENT DOCUMENTS 521681 3/1980 Australia .
516304 1/1981 Australia .

Primary Examiner—Patrick R. Salce
Assistant Examiner—Anita M. Ault
Attorney, Agent, or Firm—Schwartz, Jeffery, Schwaab, Mack, Blumenthal & Evans

[57] ABSTRACT

A circuit for controlling an inverter which derives an alternating current output by driving complementarily two switching elements serially connected to a direct current power source into switching operation. It is required for one of the switching elements to turn on while the other of the switching elements turns off, and such a state as two transistors turn on concurrently must be avoided. For this reason, a control signal to be applied to the switching element of the inverter is passed through a delay circuit. According to the present invention, the delay circuit is comprised of a counter and a logic circuit, wherein the counter is supplied with clock pulses and at the predetermined count value the counter is made to generate an output. Upon generation of the output, a control signal is made to be supplied to the switching element of the inverter through the logic circuit.

9 Claims, 4 Drawing Figures

F I G. 3
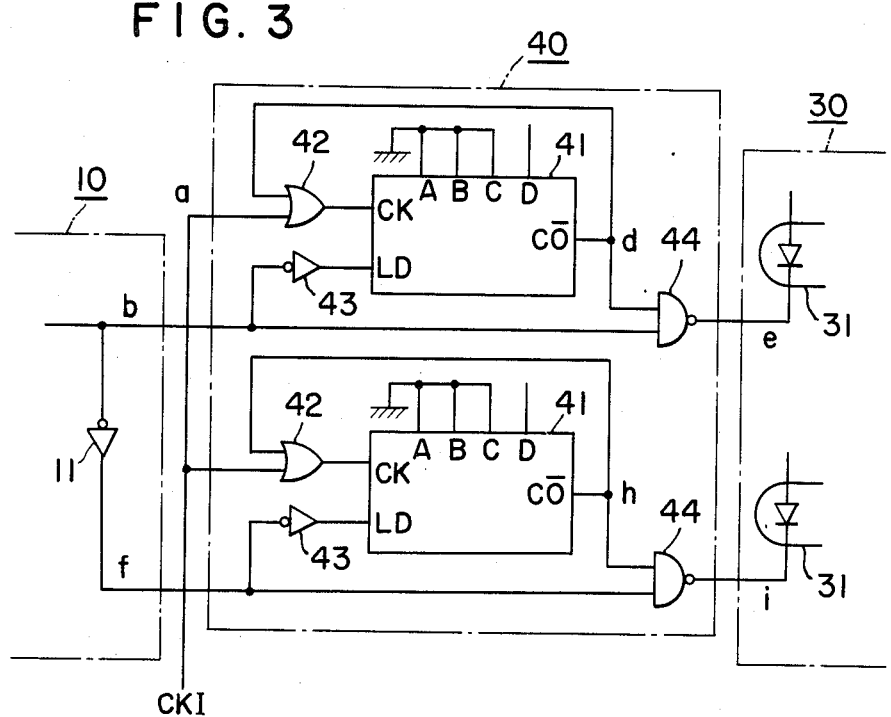

INVERTER CONTROL CIRCUIT

BACKGROUND OF THE INVENTION

The present invention relates to an inverter in which two switching elements serially connected to a direct current power source are complementarily controlled to turn on and off, and more specifically it relates to an inverter control circuit provided with delay circuits on respective control signal paths for switching elements which delay circuits are aimed at delaying respective rise times of the on-control signals by a preset amount.

In an inverter of the type that a plurality of switching circuits, each circuit comprising serially connected switching elements, are connected parallel to a direct current power source, and that independent of each switching circuit, the switching element at the positive voltage side and the switching element at the negative voltage side as viewed from the direct current power source are complementarily controlled to turn on and off, delay circuits heretofore have been provided on control signal paths for delaying respective rise times of the on-control signals by a preset amount, in order to prevent a short circuit of the power source and the breakage of the switching element itself resulting from the concurrent turning on of both switching elements.

However, each delay circuit is a combined circuit of a charge/discharge circuit made of a capacitor, a resistor, and a diode, and a NOT circuit. Therefore, the delay circuit is under the influence of the scattering in rated values of elements and the ambient temperature change. Thus, it is required to design the circuit so as to have a sufficient margin, which results in setting an off-time remarkably long. This leads to various problems such as the lowering of an output voltage of the inverter.

SUMMARY OF THE INVENTION

The present invention has been made in consideration of the above circumstances, and it is an object of the present invention to provide an inverter control circuit which can eliminate the lowering of an output voltage of an inverter and its scattering resulting from the fact that the rise times of the on-control signals for switching elements of the inverter are delayed, and in which a large scaled integration can easily be introduced for a control circuit section including a delay circuit.

In order to attain the above object, the present invention has a feature that in an inverter control circuit in which a plurality of switching circuits, each having serially connected switching elements, are connected in parallel to a direct current power source, a switching element independent of each switching circuit is provided at a positive voltage side and a at a negative voltage side viewed from the direct current power source The switching circuits are complementarily controlled to turn on and off with control signals, Further, delay circuits are provided on respective control signal paths for delaying respective rise times of the on-control signals by a predetermined amount. The delay circuit comprises a counter for counting clock pulses and generating a signal when the count value of the counter reaches a predetermined value, and a logic circuit for enagling, while the oncontrol signal is applied, a count operation of the counter and preventing the trasnsmission of the oncontrol signal until the counter starts generating the signal.

BRIEF DESCRIPTION OF THE DRAWINGS

FIG. 3 is a circuit diagram showing a main construction of an inverter control circuit according to an embodiment of the present invention.

DETAILED DESCRIPTION OF THE INVENTION

Prior to the description of the embodiment according to the present invention, a prior art described with reference to FIGS. 1 and 2, followed by the description of the embodiment according to the present invention with reference to FIGS. 3 and 4.

Figure 1:
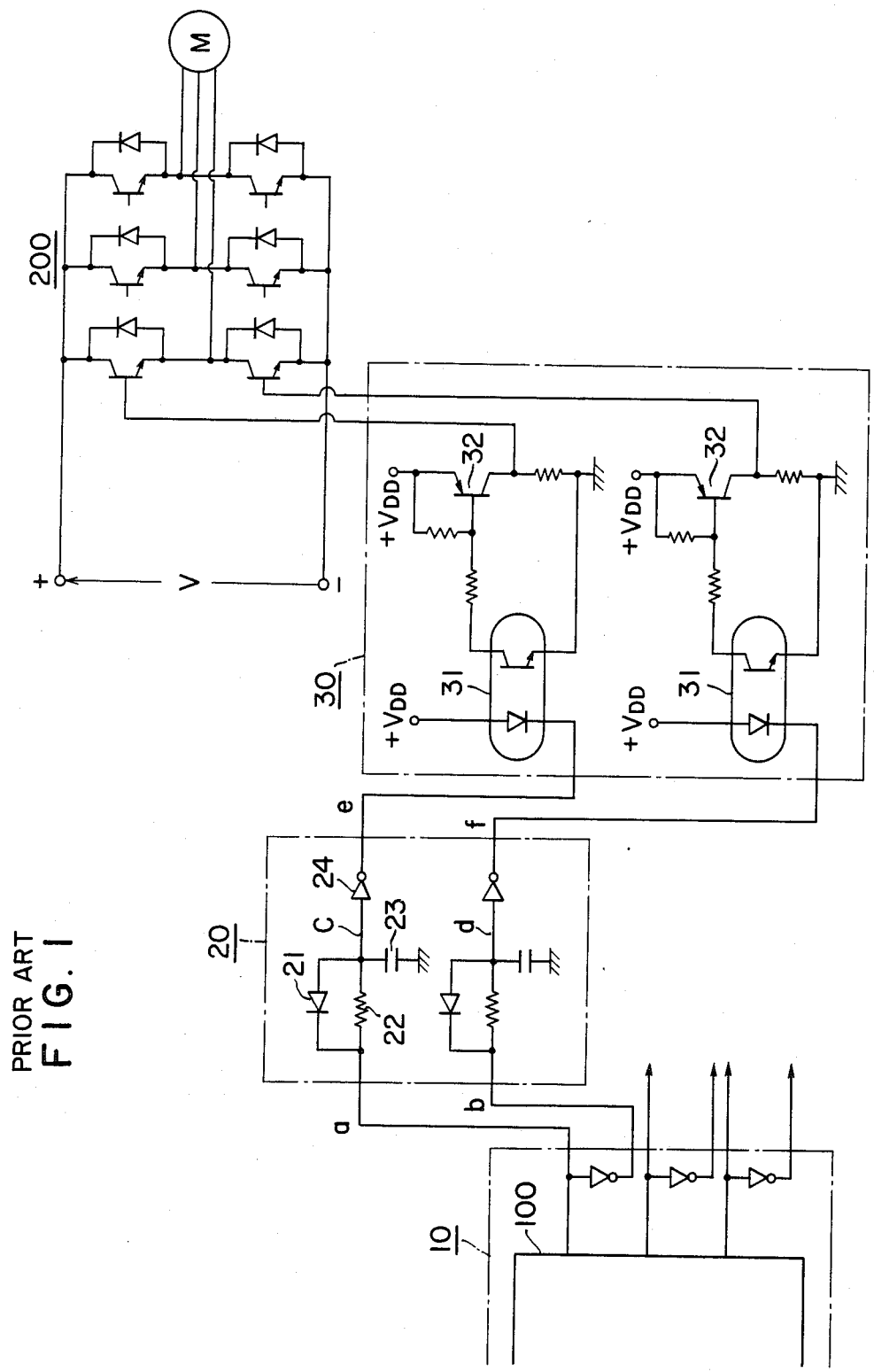
FIG. 1 is a circuit diagram showing a main construction of a prior art inverter control circuit.
Figure 2:
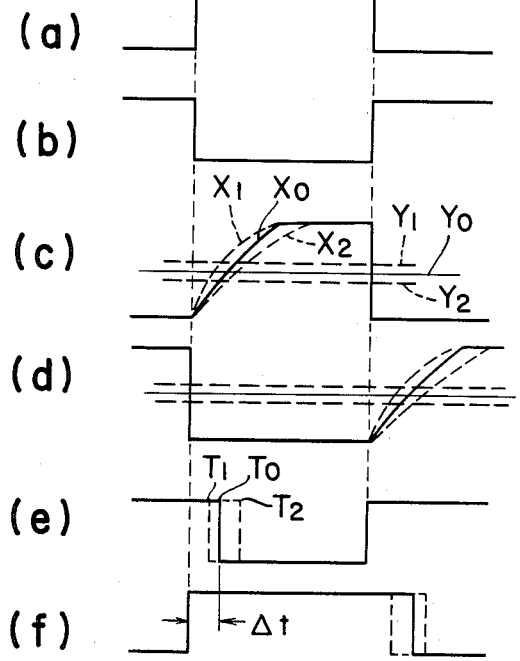
FIGS. 2(a) to 2(f) are timing charts for illustrating the operation of the inverter control circuit shown in FIG. 1.

FIG. 1 shows a main construction of an inverter control circuit now concerned and applied to an inverter of the type using transistors as switching elements. In the figure, there are shown a control circuit 10 with PWM waveform instruction circuit 100, a delay circuit 20, and a base drive circuit 30, all being provided for use with serially connected transistor switching elements. The output from the base drive circuit 30 is supplied to the base of a transistor in a transistor inverter 200. The inverter 200 supplied with a direct current input V converts it into an alternating current to feed a motor M. The motor M may for example be a compressor motor of an air conditioner among those of household electric appliances.

Among the above circuits, the control circuit 10 is for applying the output of the PWM waveform instruction circuit 100, directly or through a NOT circuit 11, to the delay circuit 20, as shown in FIGS. 2(a) and 2(b). A control signal maintaining an H level during the period the corresponding transistor is turned on and a control signal changing its level comlementarily to that of the former control signal, are output.

The delay circuit 20 is composed of a charge/discharge circuit made of a diode 21, a resistor 22 and a capacitor 23, and a NOT circuit 24 made of an analog comparator or a logic inverter. The rectangular signals from the control circuit 10 are processed by the charge discharge circuit to obtain the leading edges rising transiently. Thus, signals generated as shown by solid lines in FIGS. 2(c) and 2(d) at the output terminals c and d of the charge/discharge circuit.

The signals are inverted by the NOT circuit 24 such that when the input signal level of the NOT circuit 24 reaches a predetermined level $Y_0$, then the output signal from the NOT circuit 24 is inverted into an L level. As a result, at the output terminals e and f of the NOT circuit 24, signals shown by solid lines in FIGS. 2(e) and 2(f) are output.

The base drive circuit 30 has an insulator element 31 such as a photo coupler or the like, and while the output of the NOT circuit 24 is an L level, it allows the base current to flow in a transistor to make it turn on.

It is assumed here that the portion of the output signal from the control circuit 10, where the level is maintained at an H level, is deemed as an on-control signal. Then, the leading edge of the on-control signal is delayed, for example, by $\Delta t$ time, as seen from FIGS. 2(c) and 2(e).

In this way, such a state is prevented from occurring as the switching elements serially connected with respect to the direct current power source concurrently turn on.

However, the rated values of the resistor 22 and the capacitor 23 of the delay circuit 20 varies with the scattering of element itself and the ambient temperature change. For example, as shown in FIG. 2(c), even if the circuit elements are selected to make the level at the output terminal c of the charge/discharge circuit rise along a solid line $X_0$, the level may abruptly rise along a broken line $X_1$, or the level may gradually rise along a broken line $X_2$.

Further, the NOT circuit 24 is provided with a resistor divider circuit so that from the similar reason described above, in spite of a level setting at a solid line $Y_0$, the level may vary to a broken line $Y_1$ or $Y_2$.

Therefore, even if the rising time instant of the on-control signal is delayed by ΔT as shown in FIG. 2(e) thereby to turn on the transistor at the time $T_0$, the transistor may in practice turn on at the time $T_1$ or $T_2$.

In anticipation of the above situation, the delay time Δt has been set at a large value. However, the larger the delay time Δt is set, the longer the off-time becomes. As a result, there arise such problems as the lowering of the output voltage of the inverter and the output voltage scattering as well.

Further, recently, technology has dictated the need to implement the control circuit 10, delay circuit 20, and the base drive circuit 30 all in a single large integrated circuit. However, it has been difficult to comply with the request due to the construction as of FIG. 1 in which an analog circuit is included.

Preferred Embodiment

FIG. 3 shows an example of a main construction of an inverter control circuit according to the present invention, wherein an element indicated by the identical reference number as of FIG. 1 represents the same element as of FIG. 1. Instead of using the delay circuit 20 made of the charge/discharge circuit and the NOT circuit as in FIG. 1, a delay circuit 40 is used in this embodiment which is made of a presettable counter 41 (hereinafter called merely as counter), an OR circuit 42, and a NAND circuit 44.

The counter 41 has data input terminals A to D, a clock signal input terminal CK, a carry signal output terminal $\overline{CO}$, and a register signal input terminal LD. One input terminal of the OR circuit 42 is connected to the carry signal output terminal $\overline{CO}$, while the other input terminal thereof is connected to a clock signal generator circuit (not shown). The input terminal of the NOT circuit 43 is connected to the input terminal of the NOT circuit 11 of the control circuit 10, while the output terminal of the NOT circuit 43 is connected to the register signal input terminal LD. Further, one input terminal of the NAND circuit 44 is connected to the carry signal output terminal $\overline{CO}$, while the other input terminal thereof is connected to the input terminal of the NOT circuit 43, the output terminal of the NAND circuit 44 being connected to the insulator element 31 of the base drive circuit 30.

The circuit arrangement of the delay circuit is for a single transistor which serves as a switching element. Another transistor serially connected to the former transistor has a corresponding delay circuit as shown in FIG. 3. The other delay circuit has the same construction as above described except that the input terminal of the NOT circuit 43 is connected to the output terminal of the NOT circuit 11. Therefore, the description of the construction thereof is omitted.

The operation of the inverter control circuit constructed as above will now be described with reference to the timing charts shown in FIG. 4.

The counter 41 counts the data applied to the data input terminals A to D while the register signal input terminal LD is at an H level. The counter 41 also counts the level change from an L level to an H level of the clock pulse applied to the clock signal input terminal CK, that is, the counter 41 counts the pulse leading edge while the register input terminal LD is at an L level, and outputs an H level signal from the carry signal output terminal $\overline{CO}$ when the count value reaches the maximum.

Figure 4:
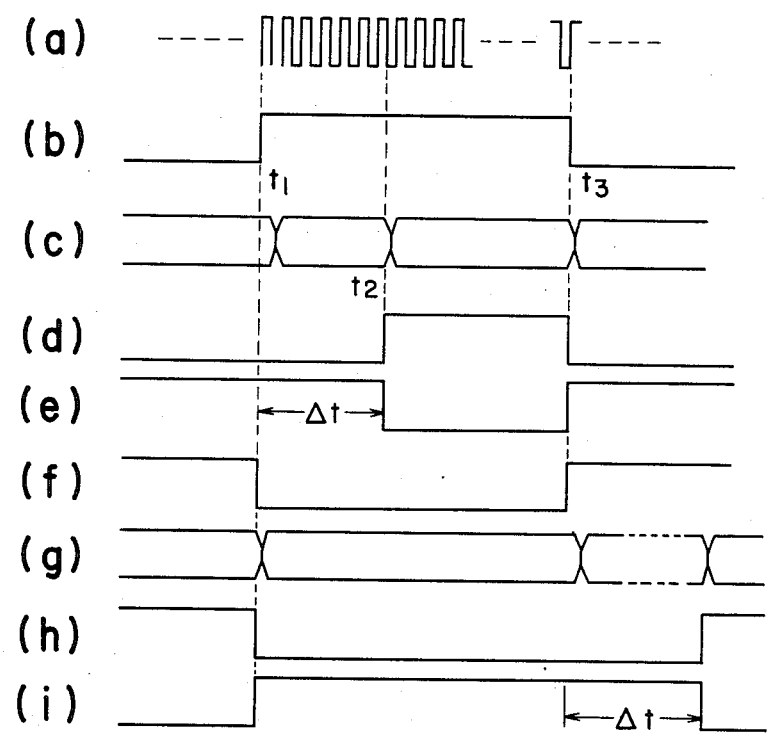
FIGS. 4(a) to 4(i) are timing charts for illustrating the operation of the embodiment shown in FIG. 3.

The character symbols a, b, d, e, f, h, and i pointing connection wires in FIG. 3 correspond respectively with the character symbols identifying each drawing in FIG. 4, wherein the count state of one of the counters 41 is shown in FIG. 4(c), and the count state of the other of the counters 41 is shown in FIG. 4(g).

When a clock signal CKI shown in FIG. 4(a) is input to the OR circuit 42 and when a control signal shown in FIG. 4(b) is input to the NOT circuit 43, the register signal input terminal of the counter 41 is maintained at an H level while the control signal is at an L level. During this period, the data applied to the data input terminals A to D, for example, "8" is set in the counter 41.

Next, when the control signal changes to an H level at a time instant $t_1$, that is, when an oncontrol signal is applied, the counter counts every one of the pulses of the clock signal CKI, and when the count contents come to the maximum value, for example, "15" at a time instant $t_2$, then the level at the carry signal output terminal $\overline{CO}$ of the counter 41 changes from an L level to an H level. In this connection, since one of the input terminals of the OR circuit 42 is maintained at an H level, the clock pulses of the clock signal CKI are not counted even if the clock signal CKI is input to the other terminal of the OR circuit 42. Therefore, the carry signal output terminal $\overline{CO}$ is maintained at an H level as shown in FIG. 4(d) until a time instant $t_3$ when the register signal input terminal LD turns to an H level.

On the other hand, the output terminal e of the NAND circuit 44 turns to an L level on condition that the carry signal is at an H level and besides the control signal is at an H level. Therefore, as shown in FIG. 4(e), the NAND circuit 44 supplies an L level signal to the insulator element 31 during the period from a time instant $t_2$ to $t_3$.

Thus, the leading edge of the on-control signal is delayed by Δt time.

Similarly to the above, the control signal output from the NOT circuit 11 of the control circuit 10 is delayed by Δt time from the leading edge of the on-control signal, as seen from FIGS. 4(f), 4(g), 4(h), and 4(i).

The delay time Δt is determined by the following equation, taking the maximum count value of the counter as $K_{MAX}$, a register data as $K_D$, and a repetition time of the clock pulses as T.

$$\Delta t = (K_{MAX} - K_D) \times T \qquad (1)$$

Therefore, the delay time Δt can be determined as desired by varying the register data with the manipulation of a switch if only an external device for inputting the register data includes the switch. If occasion should arise, the analog type delay circuit described with reference to FIG. 1 may be cascaded to the present delay circuit, with the register data K setting at the maximum count value $K_{MAX}$.

It is appreciated that such a situation as the two transistors serially connected to the direct current power source turn on at the same time can be prevented from occurring. Thus, the short circuit of the power source or the breakage of transistors can surely be avoided. In the foregoing description, a delay circuit using a presettable counter has been described. However, in sum, the leading edge of an on-control signal can be delayed by a predetermined amount as described previously, only if the delay circuit comprises a counter for counting clock pulses and generating a signal when the count value thereof reaches a predetermined value, and a logic circuit for enabling a count operation of the counter while an on-control signal is applied and preventing the transmission of the on-control signal until the counter starts generating the signal.

Further, in the above embodiment, the description has been made by using a transistor as a switching element. The switching element, however, may be a thyristor, and in sum, the present invention may be applicable to an inverter of the type that a plurality of switching circuits, each having serially connected switching elements, are connected in parallel to a direct current power source, and that independent of each switching circuit, the switching element at a positive voltage side and the switching element at a negative voltage side viewed from the direct current power source are complementarily controlled to turn on and off.

As seen from the above description of the inverter control circuit according to the present invention, since the delay circuit is constructed of a counter and a logic circuit, there exists no scattering of delay times which is caused by the scattering of circuit elements and temperature changes or the like, and which must be taken into consideration when the delay circuit is constructed of a capacitor and a resistor and the like. Moreover, an off-period of the switching circuit which is complementarily controlled to turn on and off is extensively shortened so that the lowering of the output voltage of the inverter and the scattering thereof can be eliminated, and also respective phase voltages or voltages between phases can be balanced.

Additionally, since the delay circuit is constructed only of digital elements, there is obtained an excellent effect that it is considerably easy to implement the whole control circuit including the delay circuit in a large scaled integration circuit.

What is claimed is:

1. An inverter control circuit comprising:

a plurality of switching circuits connected in parallel to direct current power source, each of said switching circuits comprising two serially connected switching elements which complementarily turn on and off upon complementary application of on-control and off-control signals; and a delay circuit for delaying a rise time of said on-control signal by a predetermined amount comprising a counter for counting clock pulses and generating a signal when the count value of said counter reaches a predetermined value, and a logic curcuit for making, while said on-control signal is applied, said counter execute a count operation and prevent the transmission of said on-control signal until said counter starts generating the output, and for transferring said off-control signal without delay, said delay circuit being provided on a control signal path for said control signal which makes a positive side element and a negative side element in each of said switching circuits viewed from said direct current power source complementarily turn on and off.

2. An inverter control circuit according to claim 1, wherein said counter is a presettable counter.

3. A delay circuit for transferring a control signal having a rising edge and a falling edge comprising:
a first means for delaying the transfer of a rising edge of the control signal to a first output;
a second means for transferring the rising edge of the control signal to a second output without delay;
a third means for transferring a falling edge of the control signal to said first output without delay; and
a fourth means for delaying the transfer of the falling edge of the control signal to said second output.

4. The delay circuit of claim 3, further comprising means for inverting said control signal at one of said first and second output terminals.

5. The delay circuit of claim 3, wherein said first and fourth means are pre-settable counters.

6. The delay circuit of claim 5, further comprising means for varying an input of said pre-settable counters.

7. The delay circuit of claim 5, wherein said first and fourthe means comprise means for transferring the control signal when a maximum count value of said pre-settable counters is reached.

8. The delay circuit of claim 7, further comprising means for disabling a clock input of said first and fourth means when a maximum count value of said pre-settable counters is reached.

9. The delay circuit of claim 7, further comprising means for enabling a clock input of said first means upon a rising edge of said control signal; and
a means for enabling a clock input of said fourth means upon a falling edge of said control signal.

* * * * *